United States Patent
Al-Shahri et al.

(10) Patent No.: US 11,754,746 B2
(45) Date of Patent: Sep. 12, 2023

(54) SYSTEMS AND METHODS FOR CREATING 4D GUIDED HISTORY MATCHED MODELS

(71) Applicant: Saudi Arabian Oil Company, Dhahran (SA)

(72) Inventors: Ali M. Al-Shahri, Doha (SA); Raheei R. Baig, Dhahran (SA); Hasan A. Nooruddin, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 325 days.

(21) Appl. No.: 17/101,577

(22) Filed: Nov. 23, 2020

(65) Prior Publication Data
US 2021/0263185 A1 Aug. 26, 2021

Related U.S. Application Data

(60) Provisional application No. 62/979,675, filed on Feb. 21, 2020.

(51) Int. Cl.
*G01V 99/00* (2009.01)
*G01V 9/02* (2006.01)
(Continued)

(52) U.S. Cl.
CPC .............. *G01V 99/005* (2013.01); *G01V 9/02* (2013.01); *G06F 30/20* (2020.01); *G06F 2111/10* (2020.01); *G06F 2113/08* (2020.01)

(58) Field of Classification Search
CPC ......... G01V 99/005; G01V 9/02; G06F 30/20
(Continued)

(56) References Cited

U.S. PATENT DOCUMENTS 5,992,519 A 11/1999 Ramakrishnan et al.
6,571,619 B2 6/2003 Herron et al.
(Continued)

OTHER PUBLICATIONS

Castro et al. (Incorporating 4D seismic data into reservoir models while honoring production and geologic data: A case study, The Leading Edge, 2009, pp. 1498-1506) (Year: 2009).*
(Continued)

*Primary Examiner* — Iftekhar A Khan
(74) *Attorney, Agent, or Firm* — DINSMORE & SHOHL LLP

(57) ABSTRACT

A system for creating a 4D guided history matched model may include a network of saturation sensors and a model processing hub. The saturation sensors may identify water production rates. The model processing hub may be in communication with the network of saturation sensors and may include a reservoir simulation model and a processor. The processor of the model processing hub may build a 4D saturation model, compare the reservoir simulation model and the 4D saturation model to generate a saturation Δ, calculate updated permeability distribution data, and update the reservoir simulation model with the updated permeability distribution data to create the 4D guided history matched model. A method of creating a 4D guided history matched model may include comparing a reservoir simulation model and a 4D saturation model, calculating updated permeability distribution data, and updating the reservoir simulation model to create the 4D guided history matched model.

15 Claims, 6 Drawing Sheets

(51) Int. Cl.
*G06F 30/20* (2020.01)
*G06F 113/08* (2020.01)
*G06F 111/10* (2020.01)

(58) Field of Classification Search
USPC .......................................................... 703/2
See application file for complete search history.

(56) References Cited

U.S. PATENT DOCUMENTS

| | | | |
|---|---|---|---|
| 7,054,749 B1* | 5/2006 | O'Meara, Jr. | G01V 11/00 702/6 |
| 7,168,310 B2 | 1/2007 | Al-Ruwaili | |
| 7,289,942 B2 | 10/2007 | Yang et al. | |
| 7,526,418 B2 | 4/2009 | Pita et al. | |
| 7,660,711 B2 | 2/2010 | Pita et al. | |
| 7,716,028 B2 | 5/2010 | Montaron et al. | |
| 8,738,341 B2 | 5/2014 | Habashy et al. | |
| 9,026,417 B2 | 5/2015 | Sequeira, Jr. et al. | |
| 11,520,077 B2* | 12/2022 | Denli | G01V 1/28 |
| 2005/0030021 A1* | 2/2005 | Prammer | G01N 24/081 324/303 |
| 2005/0149307 A1 | 7/2005 | Gurpinar et al. | |
| 2006/0085174 A1 | 4/2006 | Hemanthkumar et al. | |
| 2007/0016389 A1* | 1/2007 | Ozgen | E21B 49/00 703/10 |
| 2007/0219725 A1* | 9/2007 | Sun | G01V 1/282 702/13 |
| 2008/0162100 A1* | 7/2008 | Landa | E21B 43/00 703/10 |
| 2008/0167849 A1 | 7/2008 | Hales et al. | |
| 2009/0076632 A1* | 3/2009 | Kram | G06Q 10/063 700/33 |
| 2009/0189604 A1* | 7/2009 | Romero | G01N 24/081 324/303 |
| 2009/0299714 A1 | 12/2009 | Kelkar et al. | |
| 2010/0142323 A1* | 6/2010 | Chu | G01V 11/00 367/73 |
| 2010/0161300 A1 | 6/2010 | Yeten et al. | |
| 2010/0206559 A1 | 8/2010 | Sequeira, Jr. et al. | |
| 2010/0235154 A1 | 9/2010 | Meurer et al. | |
| 2010/0254217 A1* | 10/2010 | Chu | G01V 1/308 367/38 |
| 2011/0040543 A1* | 2/2011 | Nunez | E21B 43/16 703/10 |
| 2011/0137567 A1* | 6/2011 | Li | G01V 3/32 703/6 |
| 2011/0168391 A1 | 7/2011 | Saleri et al. | |
| 2011/0250582 A1* | 10/2011 | Gates | C09K 8/582 435/286.1 |
| 2011/0290478 A1* | 12/2011 | Sun | G06F 17/10 703/2 |
| 2012/0232859 A1* | 9/2012 | Pomerantz | G01V 1/282 703/2 |
| 2012/0253770 A1* | 10/2012 | Stern | G06F 30/20 703/10 |
| 2013/0096896 A1* | 4/2013 | Al-Shahri | E21B 43/00 703/10 |
| 2013/0096897 A1* | 4/2013 | Shahri | G01V 1/40 703/10 |
| 2014/0257706 A1* | 9/2014 | Biterge | G01V 1/40 702/13 |
| 2016/0356904 A1* | 12/2016 | Conn | E21B 43/16 |
| 2017/0046619 A1 | 2/2017 | Towailib et al. | |
| 2017/0140079 A1* | 5/2017 | Gentilhomme | G01V 1/282 |
| 2017/0234126 A1* | 8/2017 | Al-Shalabi | E21B 43/20 166/250.02 |
| 2017/0337302 A1* | 11/2017 | Mezghani | G01V 99/005 |
| 2018/0017700 A1* | 1/2018 | Shin | E21B 49/08 |
| 2018/0038204 A1 | 2/2018 | Khan et al. | |
| 2018/0230782 A1* | 8/2018 | Pankaj | G01V 1/282 |
| 2018/0275303 A1* | 9/2018 | Zhan | G01V 1/303 |
| 2021/0263185 A1* | 8/2021 | Al-Shahri | G01V 9/02 |

OTHER PUBLICATIONS

Aanonsen et al. (Effect of Scale Dependent Data Correlations in an Integrated History Matching Loop Combining Production Data and 4D Seismic Data, Society of Petroleum Engineers, 2003, pp. 1-13) (Year: 2003).*
U.S. Office Action dated Jul. 21, 2021 pertaining to U.S. Appl. No. 17/095,833, filed Nov. 12, 2020, 25 pages.
U.S. Notice of Allowance and Fee(s) Due dated Feb. 22, 2022 pertaining to U.S. Appl. No. 17/095,833, filed Nov. 12, 2020, 14 pages.
Coats, "Reservoir Simulation: State of the Art", Distinguished Author Series, SPE 10020, Society of Petroleum Engineers of AIME, pp. 1633-1642, Aug. 1982.
Coats, "Simulation of Gas Condensate Reservoir Performance", Society of Petroleum Engineeers, Journal of Petroleum Technology, pp. 1870-1886, 1985.
Coats, "Reservoir Simulation", Petroleum Engineering Handbook, pp. 48-1-48-20, 1987.
Coats et al., Compositional and Black Oil Reservoir Simulation, Society of Petroleum Engineers, SPE 29111, 1995.
Hodge et al., "A Survey of Outlier Detection Methodologies", Artificial Intelligence Review, vol. 22, No. 2, pp. 85-126, 2004.
Wang et al., "Estimation of Depths of Fluid Contacts and Relative Permeability Curves by History Matching Using Iterative Ensemble-Kalman Smoothers", Society of Petroleum Engineers, SPE Journal, pp. 509-525, Jun. 2010.
International Search Report and Written Opinion dated Apr. 22, 2021 pertaining to International application No. PCT/US2021/015611 filed Jan. 29, 2021, 17 pgs.
International Search Report and Written Opinion dated Apr. 30, 2021 pertaining to International application No. PCT/US2021/013154 filed Jan. 13, 2021, 14 pgs.

* cited by examiner

SYSTEMS AND METHODS FOR CREATING 4D GUIDED HISTORY MATCHED MODELS

CROSS-REFERENCE TO RELATED APPLICATIONS

This application claims the benefit of U.S. Provisional Application Ser. No. 62/979,675, filed Feb. 21, 2020.

BACKGROUND

Field

The present disclosure relates generally to mapping reservoirs in a petroleum exploration environment and, more specifically, to history matching reservoirs in a petroleum exploration environment.

Technical Background

History matching is the act of adjusting a model of a reservoir until it closely reproduces the past behavior of a reservoir. The historical production and pressures are matched as closely as possible. However, the accuracy of the history matching depends on the quality of the reservoir model and the quality and quantity of pressure and production data. Once a model has been history matched, it can be used to simulate future reservoir behavior with a higher degree of confidence, particularly if the adjustments are constrained by known geological properties in the reservoir.

SUMMARY

History matching subsurface reservoirs is very challenging and time consuming. The traditional history matching approach usually involves multiple iterations of trial and error with a limited number of scalar parameters to honor only surface level production data. The end result can easily be inconsistent with the input geological concepts and the subsurface measured data. The challenge is exacerbated for fields with hundreds of wells where the volume of historical data to be matched is significantly large.

Accordingly, there is an on-going need for history matching systems and methods that provide accurate and efficient history matching of reservoirs in a petroleum exploration environment. The present inventors have recognized the need for an alternative to traditional history matching methods and solutions to the challenges presently faced. By comparing a reservoir simulation model and a 4D saturation model, a 4D guided history matched model that provides a consistent surface and subsurface history match may result in an improved understanding of the reservoir and more reliable predictive simulation models.

In accordance with one embodiment of the present disclosure, systems for creating a 4D guided history matched model of a petroleum exploration environment may include a network of saturation sensors and a model processing hub. Individual saturation sensors of the network of saturation sensors may be positioned at different ones of a plurality of reservoir wells in a petroleum exploration environment. The saturation sensors may be operable to identify water production rates at different ones of the plurality of reservoir wells. The model processing hub may be in communication with the network of saturation sensors and may comprise a reservoir simulation model and a processor. The reservoir simulation model may comprise simulated saturation data, $S_{SIM}$, and initial permeability distribution data, $k_{current}$. The processor of the model processing hub may be operable to build a 4D saturation model comprising 4D saturation data, $S_{4D}$, derived from the network of saturation sensors, compare the simulated saturation data, $S_{SIM}$, of the reservoir simulation model and the 4D saturation data, $S_{4D}$, of the 4D saturation model to generate a saturation $\Delta$, calculate updated permeability distribution data, $k_{new}$, based on the saturation $\Delta$ using a permeability distribution transform function, and update the initial permeability distribution data, $k_{current}$, of the reservoir simulation model with the updated permeability distribution data, $k_{new}$, to create a 4D guided history matched model of the petroleum exploration environment.

In accordance with another embodiment of the present disclosure, a method of creating a 4D guided history matched model may include preparing a reservoir simulation model and a 4D saturation model of a petroleum exploration environment. The reservoir simulation model may comprise simulated saturation data, $S_{SIM}$, and initial permeability distribution data, $k_{current}$. The 4D saturation model may comprise 4D saturation data, $S_{4D}$. The method may further include comparing the simulated saturation data, $S_{SIM}$, of the reservoir simulation model and the 4D saturation data, $S_{4D}$, of the 4D saturation model to generate a saturation $\Delta$, calculating updated permeability distribution data, $k_{new}$, based on the saturation $\Delta$ using a permeability distribution transform function, wherein the permeability distribution transform function minimizes a subsurface saturation difference between the reservoir simulation model and the 4D saturation model, and updating initial permeability distribution data, $k_{current}$, of the reservoir simulation model with updated permeability distribution data, $k_{new}$, to create the 4D guided history matched model of the petroleum exploration environment.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings.

DETAILED DESCRIPTION

Figure 1:
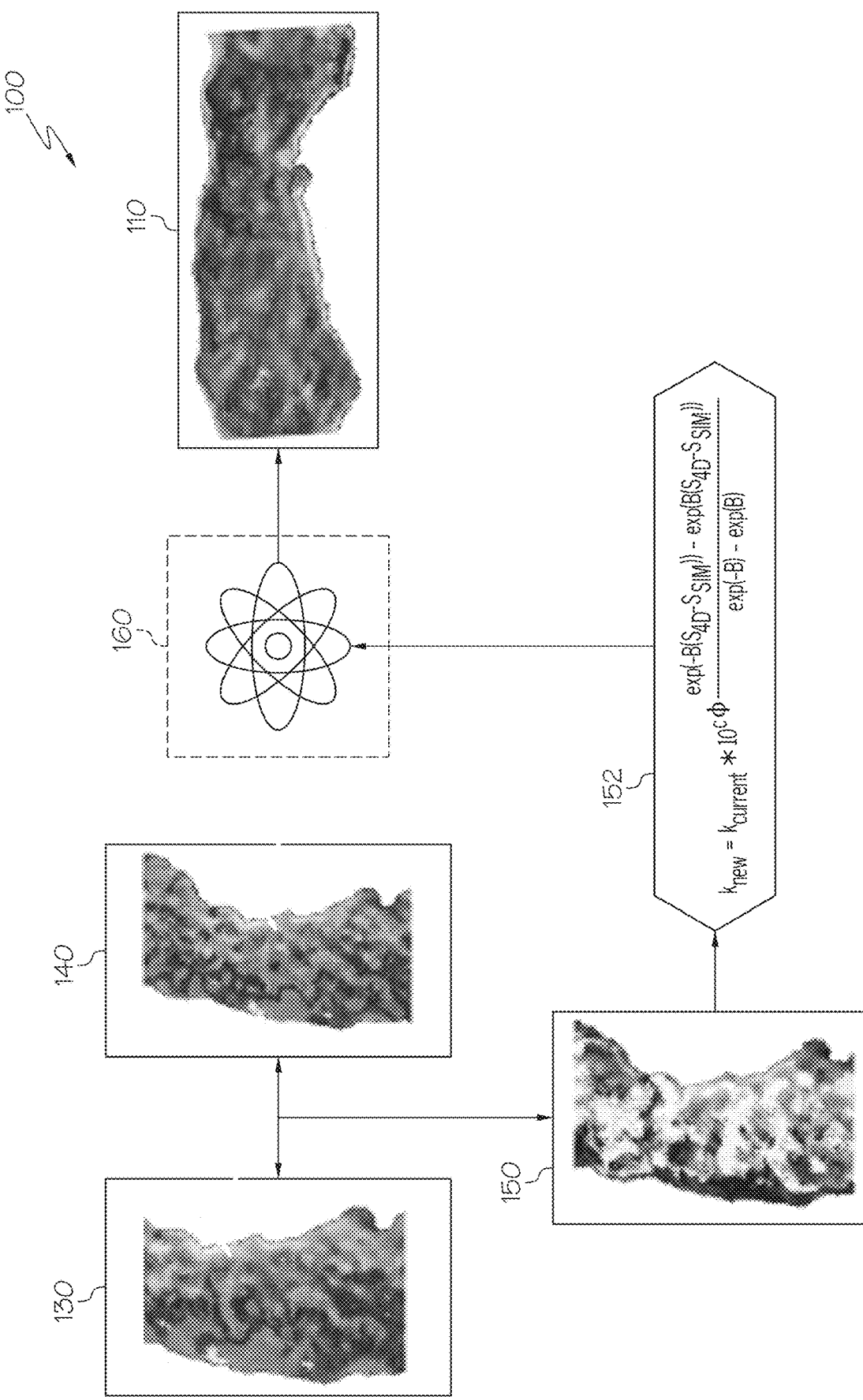
FIG. 1 schematically depicts a system for developing a 4D guided history matched model from a reservoir simulation model and a 4D saturation model, according to one or more embodiments shown and described in this disclosure.
Figure 2:
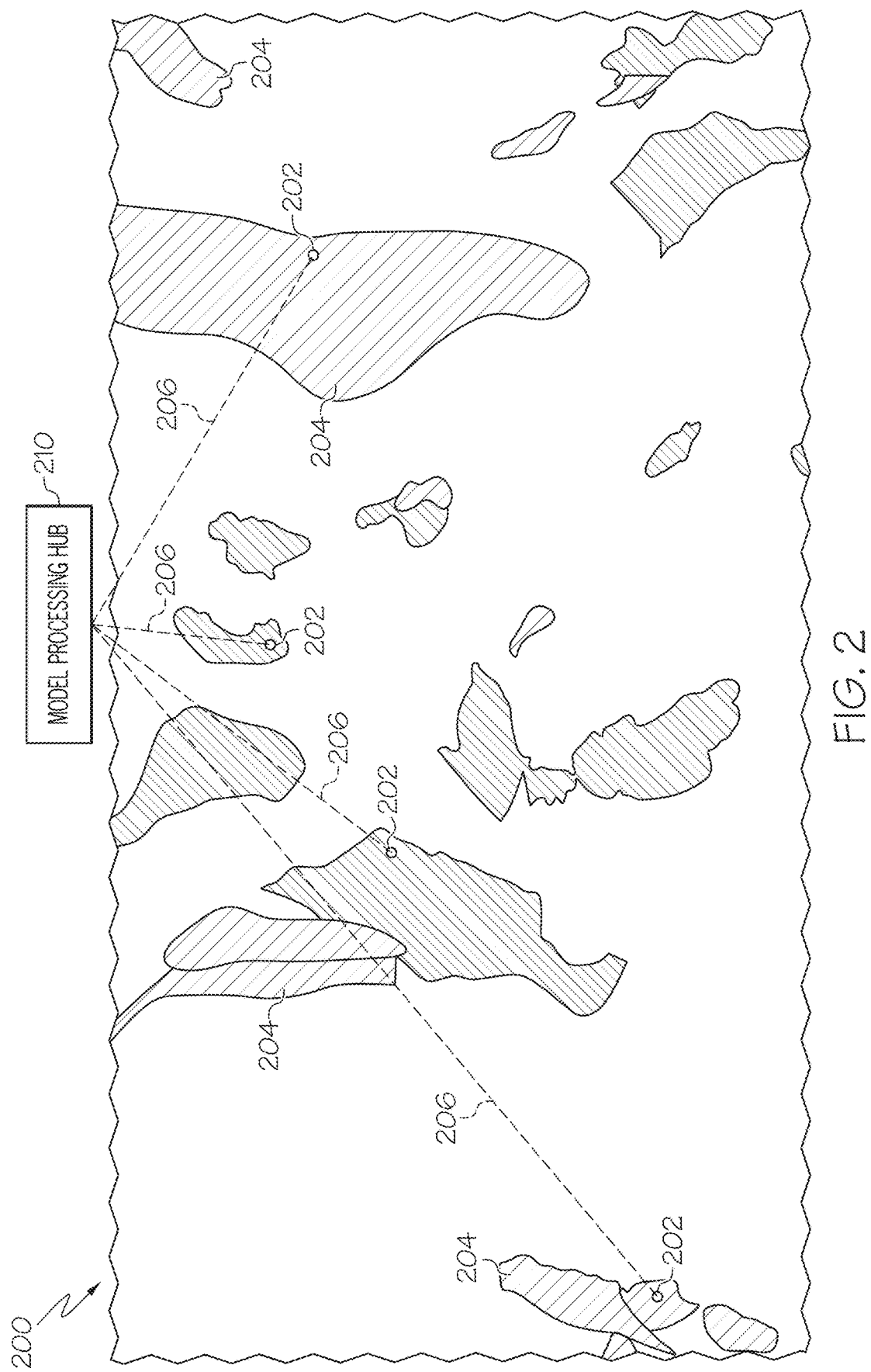
FIG. 2 schematically depicts a reservoir and petroleum exploration environment, according to one or more embodiments shown and described in this disclosure.

Referring initially to FIGS. 1 and 2, systems 100 for creating a 4D guided history matched model 110 of a petroleum exploration environment 200 may include a network of saturation sensors (not shown) and a model processing hub 210. The individual saturation sensors of the network of saturation sensors may be positioned at different ones of a plurality of reservoir wells 202 in a petroleum exploration environment 200. The saturation sensors may be operable to identify water production rates at different ones of the plurality of reservoir wells 202. The model processing hub 210 may be in communication with the network of saturation sensors and may comprise a reservoir simulation model 130 and a processor (not shown). The reservoir simulation model 130 may comprise simulated saturation data, $S_{SIM}$, and initial permeability distribution data, $k_{current}$. The processor of the model processing hub 210 may be operable to perform various functions to create the 4D guided history matched model 110 of the petroleum exploration environment 200. The processor may be operable to build a 4D saturation model 140 comprising 4D saturation data, $S_{4D}$, derived from the network of saturation sensors and compare the simulated saturation data, $S_{SIM}$, of the reservoir simulation model 130 and the 4D saturation data, $S_{4D}$, of the 4D saturation model 140 to generate a saturation $\Delta$ 150. The processor may also be operable to calculate updated permeability distribution data, $k_{new}$, based on the saturation $\Delta$ 150 using a permeability distribution transform function 152 and update the initial permeability distribution data, $k_{current}$, of the reservoir simulation model 130 with the updated permeability distribution data, $k_{new}$, to create the 4D guided history matched model 110 of the petroleum exploration environment 200.

As used in the present disclosure, a "petroleum exploration environment" may refer to a subsurface area having one or more reservoirs with resources, such as hydrocarbons, that are desired to be removed from the subsurface area.

As used in the present disclosure, "saturation" may refer to a relative amount of water, oil and gas in the pores of rock, usually as a percentage of volume. As used in this disclosure, unless noted otherwise, saturation will refer to the percentage of volume of water present in the pores of rock. Saturation may be a fluid property that may change over time. In the present disclosure, saturation data may be a user-defined value in the reservoir simulation model 130, but may be a measured value in the 4D saturation model 140.

As used in the present disclosure, "permeability" may refer to the ability, or the measurement of rock's ability, to transmit fluids, typically measured in darcies or millidarcies. Permeability is a static property that may not change over time. In the present disclosure, permeability distribution data may be a user-defined value in both the reservoir simulation model 130 and the 4D saturation model 140.

As used in the present disclosure, "porosity" may refer to the percentage of pore volume or void space, or the volume within rock that can contain fluids. Porosity may be a relatively static property that may remain substantially the same over time. It is noted that some secondary porosity may develop, where additional pore volume or void space, or the volume within rock that can contain fluids may develop through alteration of the rock.

The saturation sensors may be positioned to identify the water production rate in production flow lines at the plurality of reservoir wells 202. The saturation sensors identify the water production rate at the plurality of reservoir wells 202 in real time. The saturation sensors may be any conventional or yet to be developed sensor that is operable to detect the amount of water being produced in the petroleum exploration environment 200.

As previously described, the model processing hub 210 may be in communication with the network of saturation sensors. The model processing hub 210 may be in communication with the network of saturation sensors, positioned at the plurality of reservoir wells 202, via network paths 206. The model processing hub 210 may comprise the reservoir simulation model 130 and the processor. The model processing hub 210 may include a storage component (not shown) operable to store the reservoir simulation model 130. The reservoir simulation model 130 may be a model that has previously been developed. It is contemplated that the processor of the model processing hub 210 may be configured to generate a new reservoir simulation model 130. The reservoir simulation model 130 and processor will be described in greater detail below.

The model processing hub 210 may further comprise a user interface (not shown). The user interface may comprise a touch screen input/output device. The user interface may be in communication with the processor of the model processing hub 210. The user interface of the model processing hub 210 may comprise prompts configured to allow a user to select certain ones of the network of saturation sensors for the processor to consider in creating a 4D history matching model.

The reservoir simulation model 130 may be any model developed using surface level data. An example of such a reservoir simulation model 130 is disclosed in U.S. Pat. No. 7,526,418 B2, which is owned by the assignee of the present application. For a more complete understanding of how the reservoir simulation model 130 may be prepared, U.S. Pat. No. 7,526,418 B2 may be consulted.

As will be further described below, the processor may be operable to calculate an updated permeability of the reservoir simulation model 130 on an iterative basis. The processor may be operable to calculate multiple updated permeability distribution data, $k_{new}$, values and update the initial permeability distribution data, $k_{current}$, of the reservoir simulation model 130 with the updated permeability distribution data, $k_{new}$, that minimizes the total error between the reservoir simulation model 130 and the 4D saturation model 140.

As also further detailed below, the processor may be operable to increase permeability of the reservoir simulation model 130 in regions of the petroleum exploration environment 200 where the 4D saturation data, $S_{4D}$, is greater than the simulated saturation data, $S_{SIM}$. Similarly, the processor may be operable to decrease permeability of the reservoir simulation model 130 in regions of the petroleum exploration environment 200 where the simulated saturation data, $S_{SIM}$, is greater than the 4D saturation data, $S_{4D}$. Regardless of whether the permeability of the reservoir simulation model 130 is increased or decreased, the magnitude of the updated permeability distribution data, $k_{new}$, may be greater in higher porosity individual cells than in lower porosity individual cells. Further, the processor may be operable to divide the petroleum exploration environment 200 into a plurality of individual cells.

An example of such a 4D saturation model 140 is disclosed in U.S. Pat. Pub. No. 2013/0096896 A1, which is owned by the assignee of the present application. For a more complete understanding of how the 4D saturation model 140 may be prepared, U.S. Pat. Pub. No. 2013/0096896 A1 may be consulted.

The processor may be operable to confirm the consistency of the reservoir simulation model 130 by comparing a predicted water production rate with an actual water production rate. The processor may be operable to compare an observed surface saturation with the 4D saturation, $S_{4D}$, of the 4D saturation model 140 to confirm the 4D saturation model 140 is accurate prior to calculating the saturation Δ 150. In embodiments, prior to creating the 4D guided history matched model 110 of the petroleum exploration environment 200, the consistency of the 4D saturation model 140 may be checked to ensure the data at the subsurface level is in agreement with the data at the surface level. The consistency check process may use non-equilibrium initialization to understand how well the 4D saturation model 140 compares with observed data at the surface level. This consistency check may comprise taking an existing reservoir simulation model 130 with a pressure that closely matches the reservoir in the petroleum exploration environment 200, extracting a corresponding 3D pressure property at an observed 4D saturation, setting up a second reservoir simulation model 130 (to be used in the 4D guided history matched model 110), running the model at each observed saturation timestep, and comparing the predicted water production with measured water production. If the predicted water production and measured water production are in relative agreement, the consistency and reliability of the 4D saturation model 140 may be confirmed. The 4D saturation model 140 may be accurate if the observed surface saturation is within ±5 volume percent (v. %) of the 4D saturation, $S_{4D}$.

Figure 3:
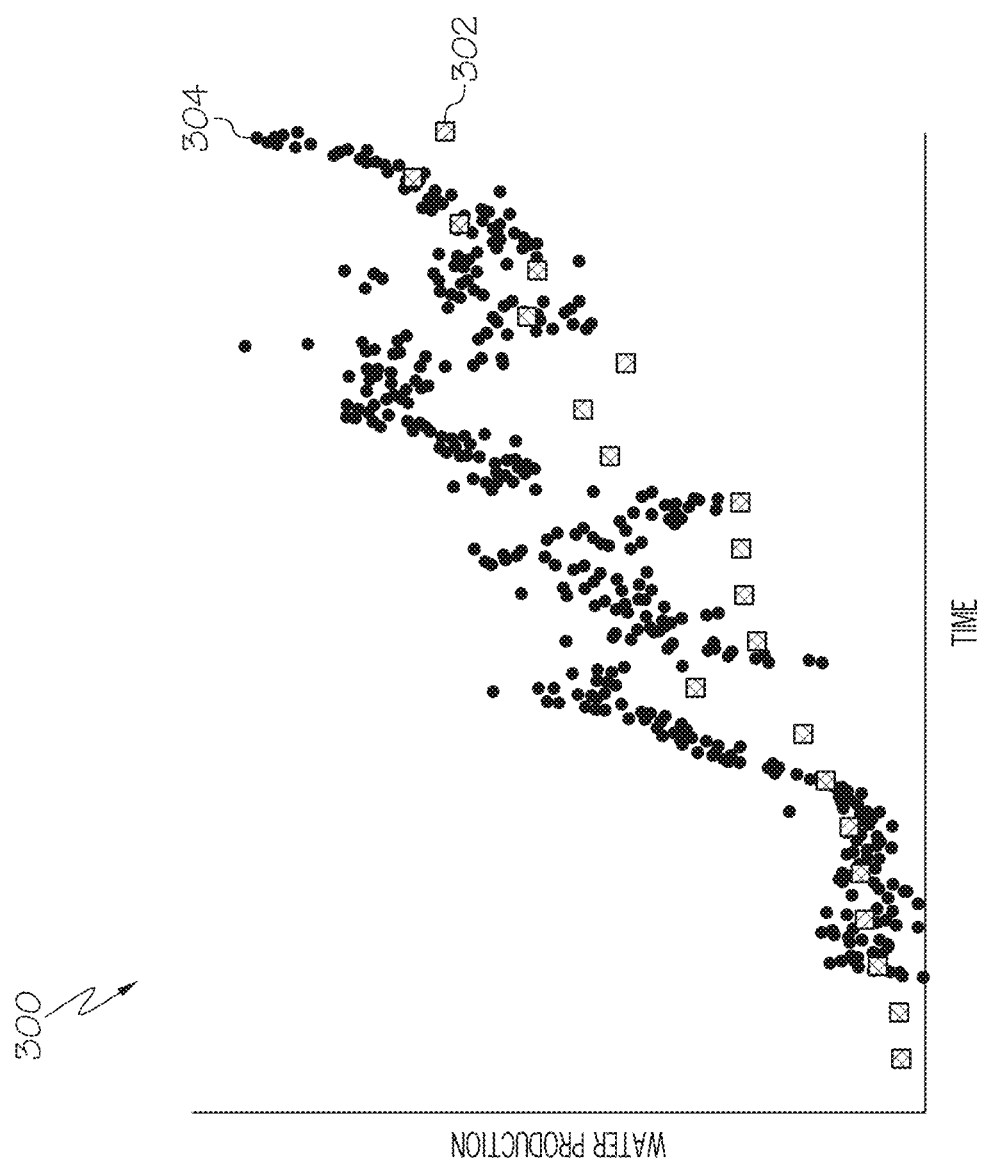
FIG. 3 graphically depicts predicted and observed water production of a reservoir in a petroleum exploration environment.

Referring now to FIG. 3, a water production graph 300 compares the observed water production 304 and the predicted water production 302 from a sample 4D saturation model 140 of a sample reservoir in a sample petroleum exploration environment and is graphically depicted. As seen in FIG. 3, the predicted water production 302 and observed water production 304 are in relative agreement. Therefore, the consistency and reliability of the 4D saturation model 140 for this sample reservoir may be confirmed.

Referring again to FIG. 1, initially, the simulated saturation data, $S_{SIM}$, of the reservoir simulation model 130 and the 4D saturation data, $S_{4D}$, of the 4D saturation model 140 may be the same. However, as production begins or continues, the difference between the simulated saturation data, $S_{SIM}$, and the 4D saturation data, $S_{4D}$, may begin to increase. Permeability distribution data may be updated accordingly. By modifying the permeability distribution data as soon as the saturation distribution begins to differ, modifications will not be drastic and the number of iterations needed to update permeability distribution data may be kept to a minimum. The modification of the permeability distribution may be subsequently repeated when differences in the simulated saturation data, $S_{SIM}$, and the 4D saturation data, $S_{4D}$, become apparent.

The permeability distribution transform function 152 may be used to calculate updated permeability distribution data, $k_{new}$, based on the saturation Δ 150. The permeability distribution transform function 152 may comprise a magnifying factor, C, and a shaping factor, B. The magnifying factor, C, may control a maximum change between the initial permeability distribution data, $k_{current}$, and the updated permeability distribution data, $k_{new}$. The shaping factor, B, may control the shape of the transform between the initial permeability distribution data, $k_{current}$, and the updated permeability distribution data, $k_{new}$. Additionally or alternatively, the permeability distribution transform function 152 may also comprise a formation porosity coefficient, ϕ. In some embodiments, the permeability distribution transform function 152 may comprise the formation porosity coefficient, ϕ, the magnifying factor, C, and the shaping factor, B. While it is contemplated that the permeability distribution transform function 152 may be modified or further calibrated, the permeability distribution transform function 152 may comprise, consist of, or consist essentially of the following formula:

$$k_{new} = k_{current} * 10^{C\phi \frac{\exp(-B(S_{4D}-S_{SIM}))-\exp(B(S_{4D}-S_{SIM}))}{\exp(-B)-\exp(B)}}$$

It should be noted that the 4D saturation data, $S_{4D}$, and the simulated saturation data, $S_{SIM}$, values used in the permeability distribution transform function 152 may be normalized values. To obtain normalized 4D saturation data, $S_{4D}$, and normalized simulated saturation data, $S_{SIM}$, the following formulas may be used:

$$S_{4D} = \frac{(S_w^{4D} - S_{w,initial})}{(1 - S_{w,initial} - S_{or})}$$

$$S_{SIM} = \frac{(S_w^{SIM} - S_{w,initial})}{(1 - S_{w,initial} - S_{or})}$$

In the above formulas, $S_w^{4D}$ is the water saturation from the 4D saturation model 140; $S_w^{SIM}$ is the water saturation from the reservoir simulation model 130; $S_{w,initial}$ is the initial water saturation with no prior production from any earlier well; and $S_{or}$ is the residual oil saturation (which is equivalent to the ratio of immobile residual oil volume divided by effective porosity). One skilled in the art will appreciate the above formula to obtain normalized 4D saturation data, $S_{4D}$, and normalized simulated saturation data, $S_{SIM}$.

As previously described, in updating the permeability distribution data, the permeability of the petroleum exploration environment 200 may be increased in regions where the 4D saturation data, $S_{4D}$, is higher than the simulated saturation data, $S_{SIM}$. Conversely, the permeability of the petroleum exploration environment 200 may be decreased in regions where the saturation in the 4D saturation data, $S_{4D}$, is lower than the simulated saturation data, $S_{SIM}$. The magnitude of the modification of the permeability distribution data may depend on the porosity value of the cell, such that higher modifications may take place in higher porosity cells and lesser modifications may take place in lower porosity cells.

Figure 4B:
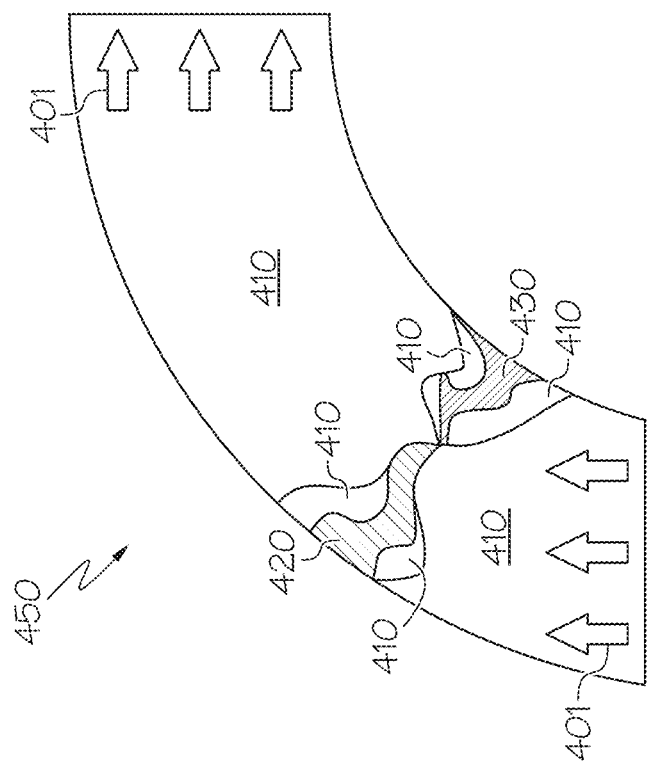
FIGS. 4A and 4B graphically depict the application of the permeability distribution transform function to a cross-sectional view of a reservoir in a petroleum exploration environment, according to one or more embodiments shown and described in this disclosure.
Figure 4A:
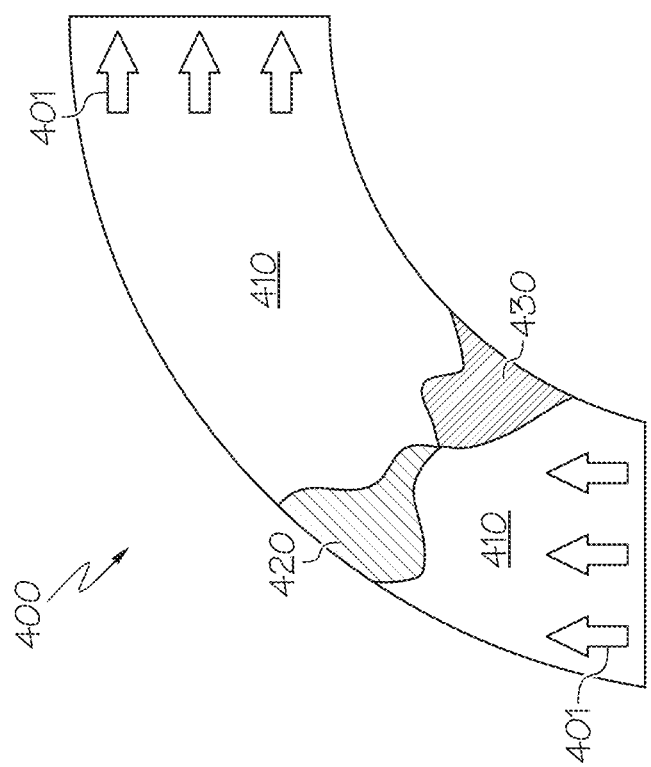

Referring now to FIGS. 4A and 4B a change in the permeability distribution data between two iterations when the saturation data is different between the 4D saturation model 140 and the reservoir simulation model 130 is schematically depicted. FIGS. 4A and 4B represent the same cross-sectional view of a reservoir in a sample petroleum exploration environment 200 where water moves in a direction indicated by the arrows 401 towards producers. In each of FIGS. 4A and 4B different C and B values are used in the permeability distribution transform function 152. As further described, C and B values used in FIG. 4B result in a the larger portion of the cross-sectional view of a reservoir where the 4D saturation data, $S_{4D}$, is equal to the simulated saturation data, $S_{SIM}$, 410. In FIG. 4A, a first iteration 400 is schematically depicted having a region where the 4D saturation data, $S_{4D}$, is higher than the simulated saturation data, $S_{SIM}$, 420 a region where the 4D saturation data, $S_{4D}$, is lower than the simulated saturation data, $S_{SIM}$, 430 and two regions where the 4D saturation data, $S_{4D}$, is equal to the simulated saturation data $S_{SIM}$, 410. As shown in FIG. 4B, the permeability distribution data is updated to arrive at a second iteration 450. In the second iteration 450, the regions where the 4D saturation data, $S_{4D}$, is higher than the simulated saturation data, $S_{SIM}$, 420 and where the 4D saturation data, $S_{4D}$, is lower than the simulated saturation data, $S_{SIM}$, 430 are smaller than the first iteration 400. In FIGS. 4A and 4B, the permeability distribution data has been updated in regions where the 4D saturation data, $S_{4D}$, and the simulated saturation data, $S_{SIM}$, are not equal. Over multiple iterations 160, the cross-sectional view of the reservoir in the sample petroleum exploration environment 200 depicted in FIGS. 4A and 4B should eventually reflect an entire region where the 4D saturation data, $S_{4D}$, is equal to the simulated saturation data $S_{SIM}$, 410. As will be further described below, multiple iterations 160 may be run with different values of C and B to determine the optimum values for C and B that provide the best improvement to the history match of the 4D guided history matched model 110.

Referring again to FIGS. 1 and 2, the processor may be operable to update the initial permeability distribution data, $k_{current}$, of the reservoir simulation model 130 only if a saturation Δ 150 is realized between the simulated saturation, $S_{SIM}$, of the reservoir simulation model 130 and the 4D saturation, $S_{4D}$, of the 4D saturation model 140. That is, a defined saturation Δ 150 may be necessary before the processor update the initial permeability distribution data, $k_{current}$, of the reservoir simulation model 130. In embodiments, the updated permeability of the reservoir simulation model 130 may be calculated only if there is saturation Δ 150 of at least 5 v. % between the simulated saturation, $S_{SIM}$, of the reservoir simulation model 130 and the 4D saturation, $S_{4D}$, of the 4D saturation model 140.

To create the 4D guided history matched model 110, the 4D saturation, $S_{4D}$, of the 4D saturation model 140 and the simulated saturation, $S_{SIM}$, of the reservoir simulation model 130 may be automatically compared. The difference in saturations at a given time may be used to update the permeability distribution transform function 152. The calibration parameters, that is, the C and B values, of the permeability distribution transform function 152 may be sampled using an experimental design method such as LatinHyperCube sampling. Updated permeability distribution data, $k_{new}$, is then modified based on the initial permeability distribution data, $k_{current}$, as a function of porosity and saturation difference as described in the permeability distribution transform function 152.

As previously described, the processor may be operable to divide the petroleum exploration environment 200 into a plurality of individual cells. The processor may be operable to calculate the saturation Δ 150, apply the permeability distribution transform function 152, and calculate updated permeability distribution data, $k_{new}$, at individual ones of the plurality of individual cells of the petroleum exploration environment 200. When history matching, reservoirs in petroleum exploration environments 200 may be divided into individual cells, such that the history matching may be performed on an individual cell level. Reservoirs in petroleum exploration environments 200 may comprise hundreds of thousands, or even millions, of individual cells. The processor may be operable to apply the updated permeability distribution data, $k_{new}$, described in detail above, at the plurality of individual cells globally to the petroleum exploration environment 200.

In developing the 4D guided history matched model 110, the objective function may be defined as the minimization of total error between the 4D saturation, $S_{4D}$, of the 4D saturation model 140 and the simulated saturation, $S_{SIM}$, of the reservoir simulation model 130. This minimization of total error may be achieved using the following objective error function:

$$obj \sum\nolimits_{k=1}^{n} \{|S_{4D}(i) - S_{SIM}(i)|\}$$

In the above formula, $S_{4D}(i)$ is the normalized water saturation from the 4D saturation model 140 for grid cell i and $S_{SIM}(i)$ is the normalized water saturation from the reservoir simulation model 130 for grid cell i. As previously described, the permeability modification using the permeability distribution transform function 152 may be performed at the grid cell level and then globally applied to the 4D guided history matched model 110. The results from the updated run are compared to the historical water data and the total error given by the objective error function is calculated. This loop may be run over multiple iterations 160, with different values of C and B, to determine the optimum values for C and B that provide the best improvement to the history match of the 4D guided history matched model 110 and minimize the objective error function. This updated permeability distribution data, $k_{new}$, may then be used to generate a further updated permeability distribution data, $k_{new}$.

An iterative algorithm may be used that utilizes the reservoir simulation model 130 and the 4D saturation model 140 to update the 4D guided history matched model 110. This iterative algorithm, utilizing the permeability distribution transform function 152 and the objective error function, may be automated and processed using a computer.

Still referring to FIGS. 1 and 2, methods of creating the 4D guided history matched models 110 may include preparing the reservoir simulation model 130 and the 4D saturation model 140 of the petroleum exploration environment 200. The reservoir simulation model 130 may comprise simulated saturation data, $S_{SIM}$, and initial permeability distribution data, $k_{current}$. The 4D saturation model 140 may comprise 4D saturation data, $S_{4D}$. The methods may further include comparing the simulated saturation data, $S_{SIM}$, of the reservoir simulation model 130 and the 4D saturation data, $S_{4D}$, of the 4D saturation model 140 to generate the saturation Δ 150 and calculating updated permeability distribution data, $k_{new}$, based on the saturation Δ 150 using a permeability distribution transform function 152. The permeability distribution transform function 152 may minimize the subsurface saturation difference between the reservoir simulation model 130 and the 4D saturation model 140. The methods may further include updating initial permeability distribution data, $k_{current}$, of the reservoir simulation model 130 with updated permeability distribution data, $k_{new}$, to create the 4D guided history matched model 110 of the petroleum exploration environment 200.

The reservoir simulation model 130 and the 4D saturation model 140 may have any of the features previously described in this disclosure of the reservoir simulation model 130 and the 4D saturation model 140, respectively.

Methods of creating the 4D guided history matched models 110 may further comprise comparing an observed surface saturation with the 4D saturation, $S_{4D}$, of the 4D saturation model 140 to confirm the 4D saturation model 140 is accurate prior to calculating the saturation Δ 150. As previously described, the 4D saturation model 140 is accurate if the observed surface saturation is within ±5 volume percent of the 4D saturation, $S_{4D}$.

Methods of creating the 4D guided history matched models 110 may also comprise calculating a plurality of updated permeability distribution data, $k_{new}$, values of the reservoir simulation model 130 based on the saturation Δ 150 using a permeability distribution transform function 152 and updating the reservoir simulation model 130 with the updated permeability distribution data, $k_{new}$, that minimizes the total error between the reservoir simulation model 130 and the 4D saturation model 140. In embodiments, at least twenty updated permeability distribution data, $k_{new}$, values of the reservoir simulation model 130 may be calculated.

EXAMPLES

The various embodiments of methods and systems for the processing of heavy oils will be further clarified by the following examples. The examples are illustrative in nature, and should not be understood to limit the subject matter of the present disclosure.

Using a reservoir in a petroleum exploration environment having greater than 10 billion barrels of recoverable hydrocarbons (i.e., a supergiant reservoir), the various embodiments of methods and systems of the present disclosure were demonstrated.

Figure 5:
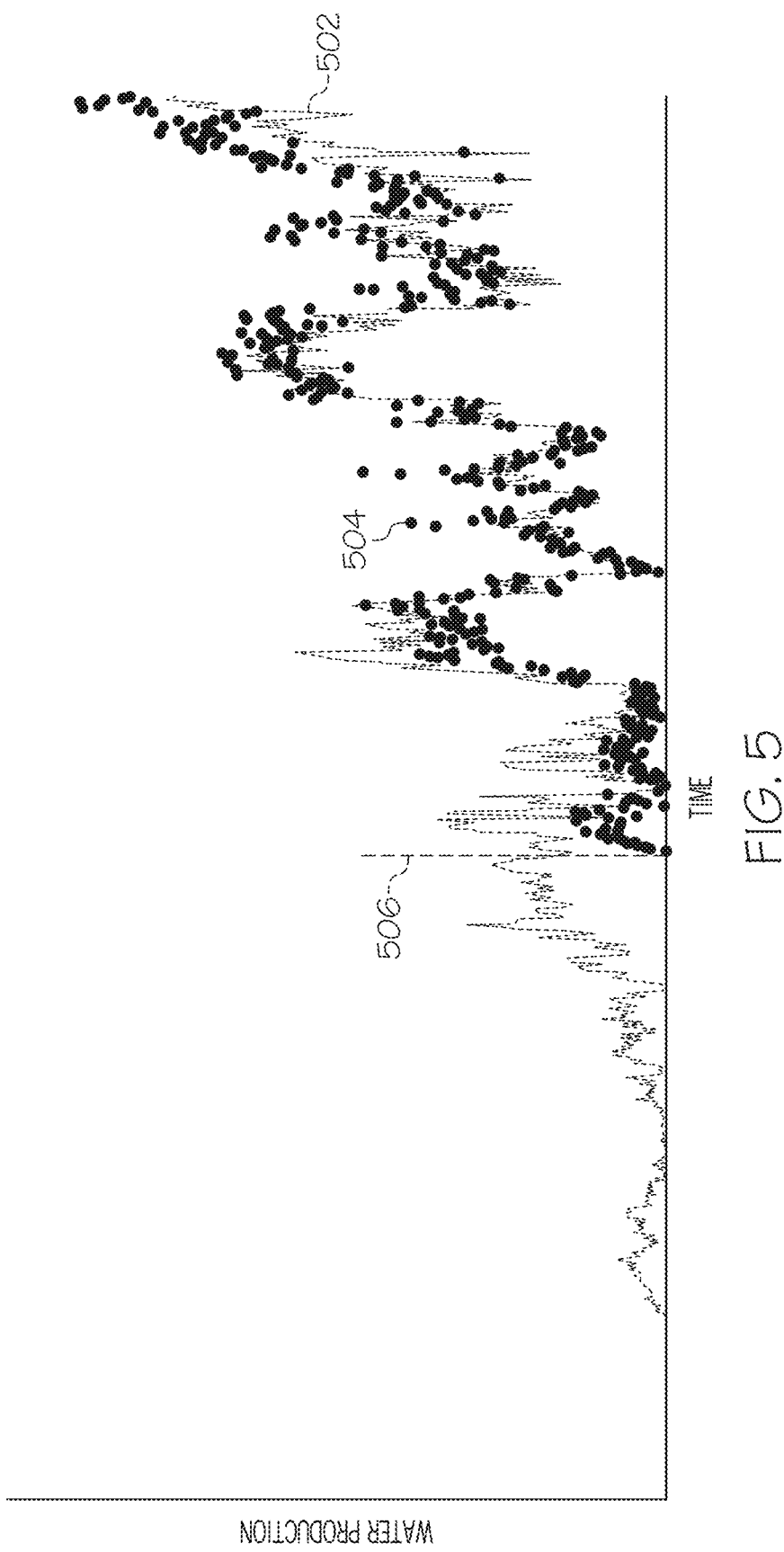
FIG. 5 graphically depicts predicted water production of a reservoir in a petroleum exploration environment using conventional history matching systems and methods.

FIG. 5 graphically depicts the field-level water production rate as a function of time for a reservoir simulation model that was history matched using a traditional approach. In FIG. 5, the predicted field-level water production rate 502 mostly over-predicts the historical data of field-level water production rate 504. In fact, at the twenty-year mark 506, the reservoir simulation model that was history matched using a traditional approach over-predicted the field-level water production rate 504.

Figure 6:
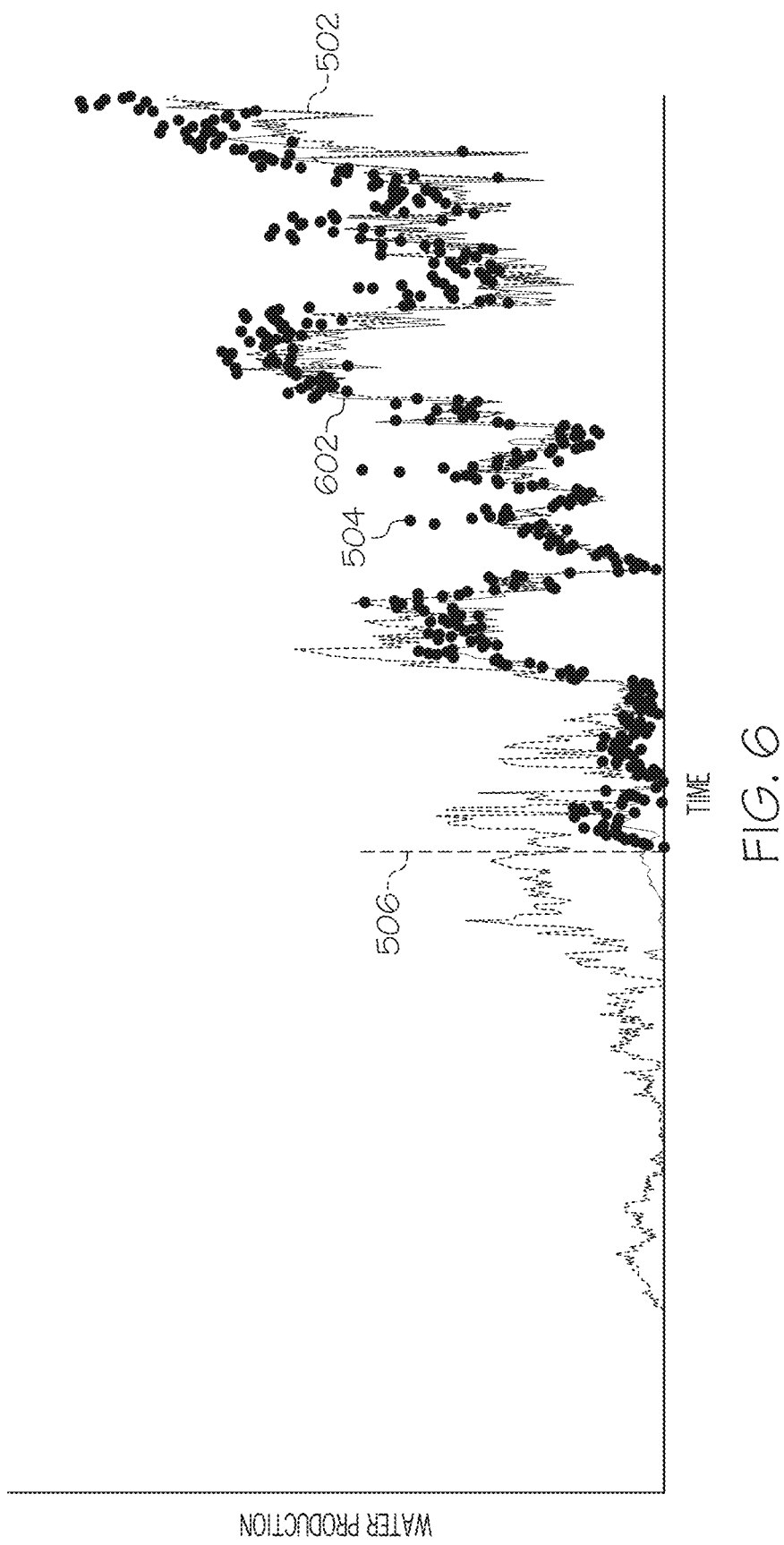
FIG. 6 graphically depicts predicted water production of a reservoir in a petroleum exploration environment using a 4D guided history matched model, according to one or more embodiments shown and described in this disclosure.

By implementing the 4D guided history matched model discussed herein, FIG. 6 graphically depicts a comparative version of FIG. 5 with additional data. In FIG. 6, the additional data provided, as compared to FIG. 5, represents the 4D guided history matched model predicted field-level water production rate 602, which much more closely models the historical data of the field-level water production rate 504 as compared to the predicted field-level water production rate 502. Further, the 4D guided history matched model largely limited or eliminated the over-prediction present in the traditional approach prior to the twenty-year mark 506.

The 4D guided history matched model may be produced in a much shorter period than the traditional history matching approach. The 4D guided history matched model was produced with much more detail and accuracy than the reservoir simulation model that was history matched using a traditional approach in roughly one-tenth the number of grid cell modifications. That is, the 4D guided history matched model took 3,157,819 modifications to arrive at the final 4D guided history matched model, whereas the reservoir simulation model that was history matched using a traditional approach required 28,747,298 modifications to arrive at the final reservoir simulation model.

The study resulted in the removal of over-prediction of field-level water production rate, an improved field-level water production rate match, and a reduced need of modifications. Additionally, such a study was completed in a much shorter time than traditional history matching. With such a 4D guided history matched model, identification of target zones for better well placement and improved reservoir recovery may be possible.

One or more aspects of the present disclosure are described herein. A first aspect of the present disclosure may include a system for creating a 4D guided history matched model of a petroleum exploration environment, the system comprising a network of saturation sensors and a model processing hub, wherein: individual saturation sensors of the network of saturation sensors are positioned at different ones of a plurality of reservoir wells in a petroleum exploration environment; the saturation sensors are operable to identify water production rates at different ones of the plurality of reservoir wells; the model processing hub is in communication with the network of saturation sensors and comprises a reservoir simulation model and a processor; the reservoir simulation model comprises simulated saturation data, $S_{SIM}$, and initial permeability distribution data, $k_{current}$; and the processor of the model processing hub is operable to build a 4D saturation model comprising 4D saturation data, $S_{4D}$, derived from the network of saturation sensors, compare the simulated saturation data, $S_{SIM}$, of the reservoir simulation model and the 4D saturation data, $S_{4D}$, of the 4D saturation model to generate a saturation Δ, calculate updated permeability distribution data, $k_{new}$, based on the saturation Δ using a permeability distribution transform function, and update the initial permeability distribution data, $k_{current}$, of the reservoir simulation model with the updated permeability distribution data, $k_{new}$, to create the 4D guided history matched model of the petroleum exploration environment.

A second aspect of the present disclosure may include the first aspect, wherein the permeability distribution transform function comprises a magnifying factor, C, and a shaping factor, B.

A third aspect of the present disclosure may include the second aspect, wherein the magnifying factor, C, controls a maximum change between the initial permeability distribution data, $k_{current}$, and the updated permeability distribution data, $k_{new}$.

A fourth aspect of the present disclosure may include either the second or third aspect, wherein the shaping factor, B, controls the shape of the transform between the initial permeability distribution data, $k_{current}$, and the updated permeability distribution data, $k_{new}$.

A fifth aspect of the present disclosure may include any one of the first through fourth aspects, wherein the permeability distribution transform function comprises a formation porosity coefficient, ϕ.

A sixth aspect of the present disclosure may include any one of the first through fifth aspects, wherein the permeability distribution transform function comprises a formation porosity coefficient, ϕ, a magnifying factor, C, and a shaping factor, B.

A seventh aspect of the present disclosure may include any one of the first through sixth aspects, wherein the permeability distribution transform function comprises the following formula:

$$k_{new} = k_{current} * 10^{C\phi \frac{\exp(-B(S_{4D}-S_{SIM}))-\exp(B(S_{4D}-S_{SIM}))}{\exp(-B)-\exp(B)}}.$$

An eighth aspect of the present disclosure may include any one of the first through seventh aspects, wherein the processor is operable to update the initial permeability distribution data, $k_{current}$, of the reservoir simulation model only if a saturation Δ is realized between the simulated saturation, $S_{SIM}$, of the reservoir simulation model and the 4D saturation, $S_{4D}$, of the 4D saturation model.

A ninth aspect of the present disclosure may include any one of the first through eighth aspects, wherein the updated permeability of the reservoir simulation model is calculated only if there is saturation Δ of at least 5 volume percent between the simulated saturation, $S_{SIM}$, of the reservoir simulation model and the 4D saturation, $S_{4D}$, of the 4D saturation model.

A tenth aspect of the present disclosure may include any one of the first through ninth aspects, wherein the processor is operable to calculate an updated permeability of the reservoir simulation model on an iterative basis.

An eleventh aspect of the present disclosure may include any one of the first through tenth aspects, wherein the processor is operable to increase permeability of the reservoir simulation model in regions of the petroleum exploration environment where the 4D saturation data, $S_{4D}$, is greater than the simulated saturation data, $S_{SIM}$.

A twelfth aspect of the present disclosure may include any one of the first through eleventh aspects, wherein the processor is operable to decrease permeability of the reservoir simulation model in regions of the petroleum exploration environment where the simulated saturation data, $S_{SIM}$, is greater than the 4D saturation data, $S_{4D}$.

A thirteenth aspect of the present disclosure may include any one of the first through twelfth aspects, wherein the processor is operable to confirm the consistency of the simulation model by comparing a predicted water production rate with an actual water production rate A fourteenth aspect of the present disclosure may include any one of the first through thirteenth aspects, wherein the processor is further operable to compare an observed surface saturation with the 4D saturation, $S_{4D}$, of the 4D saturation model to confirm the 4D saturation model is accurate prior to calculating the saturation Δ.

A fifteenth aspect of the present disclosure may include the fourteenth aspect, wherein the 4D saturation model is accurate if the observed surface saturation is within ±5 volume percent of the 4D saturation, $S_{4D}$.

A sixteenth aspect of the present disclosure may include any one of the first through fifteenth aspects, wherein: the processor is operable to divide the petroleum exploration environment into a plurality of individual cells; and the processor is operable to calculate the saturation Δ, apply the permeability distribution transform function, and calculate updated permeability distribution data, $k_{new}$, at individual ones of the plurality of individual cells of the petroleum exploration environment.

A seventeenth aspect of the present disclosure may include the sixteenth aspect, wherein the processor is operable to apply the updated permeability distribution data, $k_{new}$, at the plurality of individual cells globally to the petroleum exploration environment.

An eighteenth aspect of the present disclosure may include any one of the first through seventeenth aspects, wherein the saturation sensors identify the water production rate at the plurality of reservoir wells in real time.

A nineteenth aspect of the present disclosure may include any one of the first through eighteenth aspects, wherein: the model processing hub further comprises a user interface in communication with the processor of the model processing hub; and the user interface of the model processing hub comprises prompts configured to allow a user to select certain ones of the network of saturation sensors for the processor to consider in creating a 4D history matching model.

A twentieth aspect of the present disclosure may include a method of creating a 4D guided history matched model, the method comprising: preparing a reservoir simulation model and a 4D saturation model of a petroleum exploration environment, wherein the reservoir simulation model comprises simulated saturation data, $S_{SIM}$, and initial permeability distribution data, $k_{current}$, and the 4D saturation model comprises 4D saturation data, $S_{4D}$; comparing the simulated saturation data, $S_{SIM}$, of the reservoir simulation model and the 4D saturation data, $S_{4D}$, of the 4D saturation model to generate a saturation Δ; calculating updated permeability distribution data, $k_{new}$, based on the saturation Δ using a permeability distribution transform function, wherein the permeability distribution transform function minimizes a subsurface saturation difference between the reservoir simulation model and the 4D saturation model; and updating initial permeability distribution data, $k_{current}$, of the reservoir simulation model with updated permeability distribution data, $k_{new}$, to create the 4D guided history matched model of the petroleum exploration environment.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A petroleum exploration environment comprising a plurality of reservoir wells, a network of saturation sensors, and a model processing hub, wherein:
   individual saturation sensors of the network of saturation sensors are positioned at different ones of the plurality of reservoir wells in the petroleum exploration environment;
   the individual saturation sensors are operable to generate 4D saturation data, $S_{4D}$, at each of the plurality of reservoir wells in real time;

the model processing hub is in communication with the network of saturation sensors and comprises a reservoir simulation model and a processor;

the reservoir simulation model comprises simulated saturation data, $S_{SIM}$, and initial permeability distribution data, $k_{current}$; and the processor of the model processing hub is operable to
derive the 4D saturation data, $S_{4D}$, from individual saturation sensors of the network of saturation sensors, build a 4D saturation model comprising the 4D saturation data, $S_{4D}$, derived from the network of saturation sensors, compare the simulated saturation data, $S_{SIM}$, of the reservoir simulation model and the 4D saturation data, $S_{4D}$, of the 4D saturation model to generate a saturation $\Delta$, calculate updated permeability distribution data, $k_{new}$, based on the saturation $\Delta$ using a permeability distribution transform function, the permeability distribution transformation function comprises a formation porosity coefficient, $\phi$, a magnifying factor, C, a shaping factor, B, $$k_{new} = k_{current} * 10^{C\phi \frac{\exp(-B(S_{4D}-S_{SIM}))-\exp(B(S_{4D}-S_{SIM}))}{\exp(-B)-\exp(B)}}$$

and minimizes a subsurface saturation difference between the reservoir simulation model and the 4D saturation model, and update the initial permeability distribution data, $k_{current}$, of the reservoir simulation model with the updated permeability distribution data, $k_{new}$, to create a 4D guided history matched model of the petroleum exploration environment.

2. The environment of claim 1 wherein the magnifying factor, C, controls a maximum change between the initial permeability distribution data, $k_{current}$, and the updated permeability distribution data, $k_{new}$.

3. The environment of claim 1, wherein the shaping factor, B, controls the shape of the transform between the initial permeability distribution data, $k_{current}$, and the updated permeability distribution data, $k_{new}$.

4. The environment of claim 1, wherein the processor is operable to update the initial permeability distribution data, $k_{current}$, of the reservoir simulation model only if a saturation $\Delta$ is realized between the simulated saturation, $S_{SIM}$, of the reservoir simulation model and the 4D saturation data, $S_{4D}$, of the 4D saturation model.

5. The environment of claim 1, wherein the updated permeability of the reservoir simulation model is calculated only if there is saturation $\Delta$ of at least 5 volume percent between the simulated saturation, $S_{SIM}$, of the reservoir simulation model and the 4D saturation data, $S_{4D}$, of the 4D saturation model.

6. The environment of claim 1, wherein the processor is operable to calculate an updated permeability of the reservoir simulation model on an iterative basis.

7. The environment of claim 1, wherein the processor is operable to increase permeability of the reservoir simulation model in regions of the petroleum exploration environment based on the updated permeability distribution data.

8. The environment of claim 1, wherein the processor is operable to decrease permeability of the reservoir simulation model in regions of the petroleum exploration environment based on the updated permeability distribution data.

9. The environment of claim 1, wherein the processor is operable to confirm the consistency of the simulation model by comparing a predicted water production rate with an actual water production rate.

10. The environment of claim 1, wherein the processor is further operable to compare an observed surface saturation with the 4D saturation data, $S_{4D}$, of the 4D saturation model to confirm the 4D saturation model is accurate prior to calculating the saturation $\Delta$.

11. The environment of claim 10, wherein the 4D saturation model is accurate if the observed surface saturation is within ±5 volume percent of the 4D saturation data, $S_{4D}$.

12. The environment of claim 1, wherein:
the processor is operable to divide the petroleum exploration environment into a plurality of individual cells; and the processor is operable to calculate the saturation $\Delta$, apply the permeability distribution transform function, and calculate updated permeability distribution data, $k_{new}$, at individual ones of the plurality of individual cells of the petroleum exploration environment.

13. The environment of claim 12, wherein the processor is operable to apply the updated permeability distribution data, $k_{new}$, at the plurality of individual cells globally to the petroleum exploration environment.

14. The environment of claim 1, wherein:
the model processing hub further comprises a user interface in communication with the processor of the model processing hub; and the user interface of the model processing hub comprises prompts configured to allow a user to select certain ones of the network of saturation sensors for the processor to consider in creating a 4D history matching model.

15. A method of creating a 4D guided history matched model of a petroleum exploration environment comprising a plurality of reservoir wells, a network of saturation sensors, and a model processing hub, the method comprising:

positioning individual saturation sensors of the network of saturation sensors at different ones of the plurality of reservoir wells in the petroleum exploration environment, wherein the individual saturation sensors are operable to generate 4D saturation data, $S_{4D}$, at each of the plurality of reservoir wells in real time;

preparing a reservoir simulation model and a 4D saturation model of the petroleum exploration environment, wherein the reservoir simulation model comprises simulated saturation data, $S_{SIM}$, and initial permeability distribution data, $k_{current}$, and the 4D saturation model comprises the 4D saturation data, $S_{4D}$, generated by the individual saturation sensors;

comparing the simulated saturation data, $S_{SIM}$, of the reservoir simulation model and the 4D saturation data, $S_{4D}$, of the 4D saturation model to generate a saturation $\Delta$;

calculating updated permeability distribution data, $k_{new}$, based on the saturation $\Delta$ using a permeability distribution transform function, wherein the permeability distribution transform function comprises a formation porosity coefficient, $\phi$, a magnifying factor, C, a shaping factor, B, $$k_{new} = k_{current} * 10^{C\phi \frac{\exp(-B(S_{4D}-S_{SIM}))-\exp(B(S_{4D}-S_{SIM}))}{\exp(-B)-\exp(B)}}$$

and minimizes a subsurface saturation difference between the reservoir simulation model and the 4D saturation model; and updating initial permeability distribution data, $k_{current}$, of the reservoir simulation model with updated permeability distribution data, $k_{new}$, to create the 4D guided history matched model of the petroleum exploration environment.

* * * * *

UNITED STATES PATENT AND TRADEMARK OFFICE
CERTIFICATE OF CORRECTION

| | |
|---|---|
| PATENT NO. | : 11,754,746 B2 |
| APPLICATION NO. | : 17/101577 |
| DATED | : September 12, 2023 |
| INVENTOR(S) | : Ali M. Al-Shahri, Raheel R. Baig and Hasan A. Nooruddin |

It is certified that error appears in the above-identified patent and that said Letters Patent is hereby corrected as shown below:

On the Title Page

Column 1, item (72), Inventors: "Raheei R. Baig" should read --Raheel R. Baig--.

Signed and Sealed this
Twelfth Day of December, 2023

Katherine Kelly Vidal
*Director of the United States Patent and Trademark Office*